United States Patent [19]

Schulberg

[11] 4,249,293
[45] Feb. 10, 1981

[54] PULLING TOOL

[76] Inventor: Harvey I. Schulberg, 16100 S. Avalon Blvd., Gardena, Calif. 90248

[21] Appl. No.: 28,101

[22] Filed: Apr. 9, 1979

[51] Int. Cl.³ .............................................. B23P 19/04
[52] U.S. Cl. ........................................ 29/252; 29/263
[58] Field of Search ......................... 29/252, 263, 265; 258/18; 81/361, 113, 114; 279/43, 50

[56] References Cited

U.S. PATENT DOCUMENTS

| 2,050,005 | 8/1936 | Heegeman | 29/263 |
| 2,797,889 | 7/1957 | Talboys | 254/18 |
| 4,059,883 | 11/1977 | Osborne | 29/263 |

Primary Examiner—Robert C. Watson
Attorney, Agent, or Firm—Lyon & Lyon

[57] ABSTRACT

A pulling tool of generally elongated shape operable by hydraulic pressure to pull force-fitted elements from an anchorage, such as cups from the arms of universal joints. At the forward end there is a gripping sleeve to be located around the element, a retaining sleeve to be located about the gripping sleeve and a reaction sleeve around the retaining sleeve. Interaction of the walls of the gripping sleeve and retaining sleeve cause transverse contraction of the gripping sleeve about the element as the hydraulic pressure pulls the gripping sleeve rearwardly. An ejector pin urges the element longitudinally from the tool after the arms constituting the gripping sleeve open, which occurs due to differing radial forces applied on the gripping sleeve as it moves rearwardly. The leading edge of the reaction sleeve reacts against the anchorage from which the element is pulled.

25 Claims, 7 Drawing Figures

PULLING TOOL

This invention relates to a pulling tool. In particular the invention is concerned with such a tool for pulling cylindrical cups from the arms of a universal joint, or removing other force-fitted bushings, sleeves, linings and pins from an anchorage.

In separating two members which have close tolerances from each other care has to be taken that the members are separated along their axial line of engagement, for if any twisting were to occur between the members a jamming could take place thereby inhibiting the free movement permitting separation of the members. Such is a situation in the removal of a cup from the arm of the universal joint. The cup rotates on needle bearings on the universal arm and the fitting between the cup bearings and arm has a close tolerance. Thus if one were to endeavor to separate the cup by tapping at one circumferential side, the opposite side would jam into the universal arm. If one could get the cup off, the arm and the cup might be distorted to the degree that reuse would not be possible.

In order to ensure smooth ejection of the cup from the universal tools such as that described in U.S. Pat. No. 3,102,333 have been developed. Here the axial force is exhibited centrally to avoid the problem mentioned, but in this case the tool is manual. A problem in using such a tool often is that the needle bearings come loose from their housing and the cup cannot be reused.

U.S. Pat. No. 3,863,322 discloses a similar tool for removing a hub from a shaft: again the tool operates manually. Similarly U.S. Pat. No. 3,383,755 illustrates a bearing puller device operating manually to remove the parts of bearings from a shaft. U.S. Pat. No. 1,155,720 shows yet a further example of a pulling tool wherein the axial force is provided manually and where the gripping jaws are adjustable to suit the subject being pulled. Interaction of the gripping jaws on a tapered surface which are tightened by bolt means provides for effective gripping of the tool on the subject being pulled.

In U.S. Pat. No. 3,813,751 there is disclosed a hydraulic chuck which provides receiving means for engaging a tube which is to be expanded under fluid pressure, the chuck tightly gripping one end of the tube, and there being a tapered wall cooperative with the gripping jaws to ensure tight sealing engagement between the elements.

Hydraulic pulling tools are known as disclosed in U.S. Pat. Nos. 2,950,525, 2,979,889 and 3,791,011. In U.S. Pat. No. 2,950,525 there is disclosed a tube pulling tool where by using the interaction of forces developed by interacting tapered members a tube can be engaged internally and removed from its anchorage. In U.S. Pat. No. 2,797,889 there is disclosed a hydraulic spike puller where a claw is provided at the end of a rod operable by hydraulic pressure, and the pressure draws a spike, which has been clawed in the leading end of the tool, from its anchorage. U.S. Pat. No. 3,791,011 is another example of a tube pulling device where a tube is engaged internally by a gripping member which interacts with tapered surfaces so as to impart the requisite degree of transverse force and thereby permit tube extraction.

It is unknown to have a hydraulic tool which can operate around a subject element and pull this subject element from its anchorage. Thus in the field of universal cup pulling, bearing pulling, and key pulling no hydraulic type tool exists for removing elements from their anchorage. Indeed, the applicant is unaware of any tool which can use the benefit of hydraulic-like force for pulling a subject element from its anchorage in a direction substantially axially relative to its anchored location on its foundation.

It is an object of this invention to provide a tool which can use the benefit of hydraulic-like pressure for removing by a pulling or a sucking force an element from its anchorage by gripping that element on its outside and extracting the subject element substantially in the axial direction which dictates its location on the foundation.

Further it is an object of such a tool to minimize any distortion of the subject element or its anchorage due to the pulling process, and further it is an object to facilitate reuse of the anchorage or subject element after pulling as may be necessary.

The invention provides a tool for pulling a subject element from its anchorage, the tool having a forward and rear end. Located at the forward end is a gripping member which is movable under pressure along a defined pulling path towards the rear end of the tool. The gripping member has at least two limbs between which the subject element is receivable and the limbs are movable relative to each other in a direction transverse the pulling path. Outside of the gripping member there is retaining means and the inner wall of the retaining means coacts with the outer wall of at least one of the limbs of the gripping member in a retracted position of the gripping means thereby squeezing the limbs relatively inwards and causing a transverse force on the subject element. As the gripping element moves rearwardly the subject element is extracted from its anchorage and a step is provided between the coacting surfaces of the gripping member and the retaining means such that after a predetermined travel the limbs of the gripping means expand transversely and free the subject element from the gripping means and the pulling force. Pressure generator means creates the pulling force and this is imparted through connector means to the gripping element so as to permit movement of the gripping element between the forward end and a position rearwardly of the forward end.

The invention is now further described with reference to the accompanying drawings which illustrate the pulling tool of the invention in connection with the removal of cups from the arms of a universal joint. The invention is not to be considered as limited to the removal of such cups, nor indeed cylindrically shaped subject element such as a bearing about a shaft. The pulling tool may have application to the removal of other elements from their foundation, particularly where such elements must be pulled or extracted substantially in the axial direction dictating its anchorage in a foundation.

Figure 1:
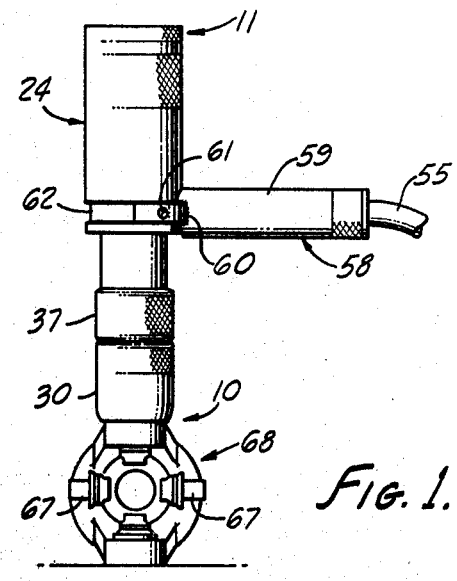
FIG. 1 is a side elevation of the tool in operative position extracting the cup from an arm of a universal joint.

A hydraulic tool for pulling a cup from the arm of a universal joint is of a generally elongated shape and has a forward end 10 and a rear end 11. Located at the forward end 10 is a gripping sleeve 12 which has at its leading end a circumferentially built up area 13 which extends from the sleeve's leading end 14 rearwardly towards the sleeve's rear end 15. The built up ring 13 is constituted by a hardened material. An external step 16 is provided on the outer wall 17 of the gripping sleeve 12. At the rear end 15 of the gripping sleeve 12 there is a base 18 which is provided with a threaded aperture 19, the purpose of which will be described below.

A retaining sleeve 20 is positioned around the gripping sleeve 12. The rear end of sleeve 20 is threaded internally at 21 for connection with a threaded protrusion 22 from the front wall 23 of cylinder 24. The leading end of the retaining sleeve 20 provides a stepped zone 25 so that the built up ring 13 of the gripping sleeve 12 and the step 16 of the sleeve 12 mate snugly within the wall of the retaining sleeve 20 so that the front ends of both the gripping sleeve 12 and retaining sleeve 20 are substantially flush with each other. Rearwardly of the step zone 25 of retaining sleeve 20 the wall 26 defines a lesser diameter for a short length and after a step 27 defines there is a length having an increased diameter and, in turn, rearwards of that length, step 28 defines the length of reduced diameter for the retaining sleeve 20. The outer wall 29 of retaining sleeve 20 tapers outwardly from its leading end.

About the retaining sleeve 20 there is located a reaction sleeve 30, and towards the leading end there is provided an inner surface 31 with a portion 32 which tapers matingly with wall 29. The length of the reaction sleeve 30 is designed so that a circumferential leading edge 32 exists in front of the leading end 14 as defined by the gripping sleeve 12 and retaining sleeve 20. A set screw 34 inserted through the wall 35 of reaction sleeve 30 protrudes into an aperture 36 in wall 26 of the retaining sleeve 20, and prevents rotation of the reaction sleeve 30 about the retaining sleeve 20.

Also located about the retaining sleeve 20 is a collet 37 which can slide freely about the retaining sleeve 20 as indicated by the phantom lines 37a. The purpose of this collet is to provide an axial impact force to the rear end of the reaction sleeve 30 thereby to release the locking effect created by the coacting tapered portions 29 and 31 as may be required.

A cylinder 24 is located rearwardly of the retaining sleeve 20 and is defined by the front wall 23, side wall 37 and a base plate 38 which engages threadingly and sealingly as indicated by numeral 39, the rear end of side wall 37. Contained within the cylinder 24 is a piston 40 which provides at its leading end a piston rod 41 constituted by a tubular member. The leading end 42 of the piston rod 41 is threaded for engagement with threaded aperture 19 of the gripping sleeve. The leading end 42 extends through the threaded aperture 19 and a bolt-like formation 43 engages threadingly as indicated by numeral 44 the free leading end 42 of the piston rod 41. Bolt 43 provides a central bore 45.

Within the tubular piston rod 41 there is disposed an ejector pin 46 which is mounted at its rear end within a cylindrical housing 47 in the rear of piston 40. A mating cylindrical slug 48 reciprocates within the cylinder housing 47. Slug 48 is affixed by an Allen screw 49 to the piston rod 41. The base 50 of slug 48 can move rearwardly into contact with the base wall 51 of base plate 38, and forwardly the piston rod 41 can be as far advanced as the end 52 of piston slug 48 abuts wall end 53 within the body of piston 40.

About midway along the tool length there is a supply 54 for hydraulic fluid. The supply 54 is fed through a pipe 55 which is connected by coupling means 56 to a port 57 in the front wall 23 of cylinder 24. Pipe 55 and the coupling connection 56 is disposed within the handle 58 for the tool. The handle 58 is constituted by a tubular pipe 59 which provides two forked limbs 60 (only one of which is shown in the drawings) connected to the cylinder 24 by bolt means 61. The limbs 60 partially embrace the cylinder 24 and are accommodated within a slot 62 in the outside cylinder wall.

The gripping sleeve 12 is constituted by the four limbs 63 which are defined between slots 64 and which extend from the leading end 14 towards a zone near to the rear end 15 of the gripping sleeve 12. The slots 64 permit the limbs 63 to flex relative to each other so that there can be relative contraction of the gripping sleeve 12 about the subject element, which, in the present example, is a cup on the arm of a universal joint. It has been found that similar axially directed slots 64a in the retaining sleeve 20 enhance the operation and interaction of the two sleeves, and their interaction with the reaction sleeve 30.

Contained within the cylinder 24 is a spring 65 which acts to urge the piston 40 towards the forward end 23 of cylinder 24.

Figure 2:
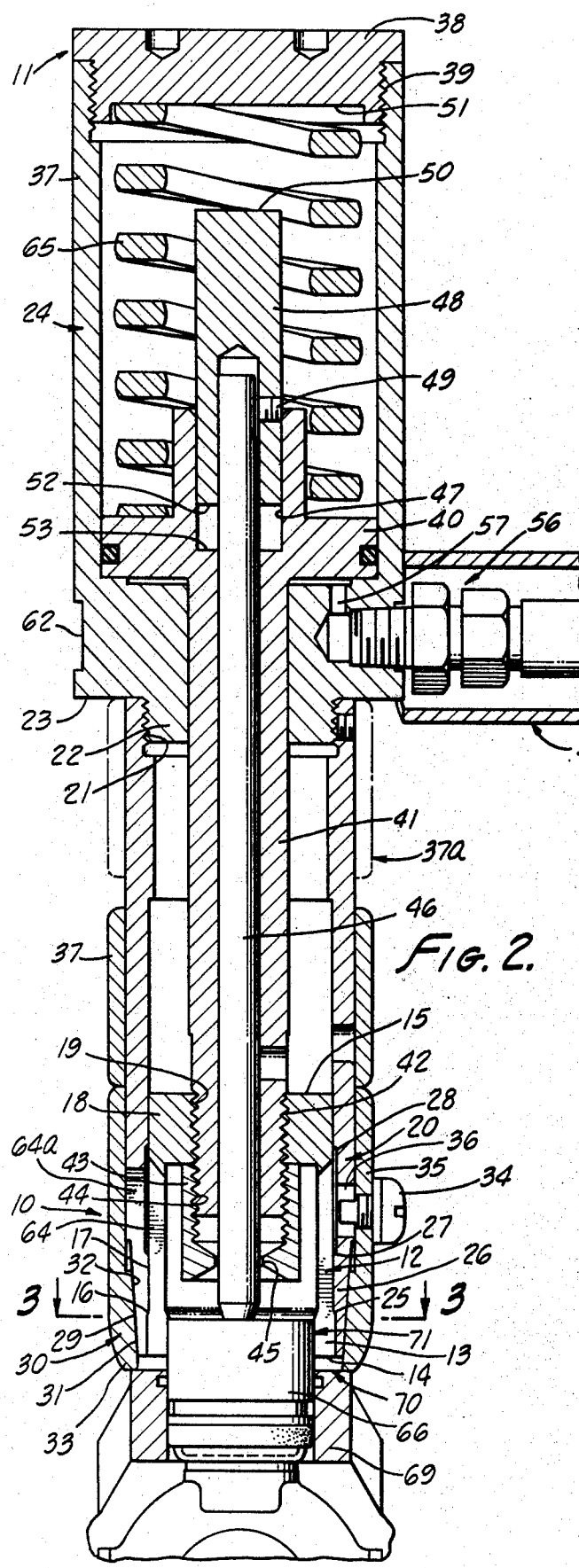
FIG. 2 is a sectional side view of the tool in accordance with the invention in the position showing commencement of cup removal from the universal joint.
Figure 3:
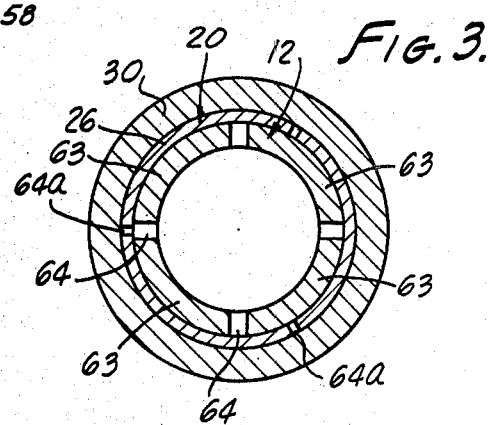
FIG. 3 is a sectional end view along lines 3—3 of FIG. 2 illustrating the relative positions of sleeves of the tool.

In operation of the pulling tool to remove a cup 66 from the arm 67 of a universal joint generally indicated by numeral 68 the lead extension 33 of reaction sleeve 30 is placed on the housing wall 69 of universal joint 68. The cup 66 will not normally extend beyond the outer surface 70 of the housing wall 69, and by tapping the universal joint arm from the opposite side sufficient movement of the arm 67 can be obtained within the housing 69 so that edge 71 of the cup 66 can protrude from the housing wall surface 70. The edge 71 then fits within the built up ring 13 on the limbs 63 of the gripping sleeve 12 in a snug fashion. The stepped zone 25 of the retaining ring 20 coacts with the stepped zone 16 of the gripping sleeve 12 in the manner illustrated in FIG. 2. The ejector pin 46 rests on the top of cup 66 and it is in a position of free play and thus no ejection force is present on the cup 66. The relative disposition of the limbs 63 are as depicted in FIG. 3 and there is there defined slots 64 with their natural width.

Figure 5:
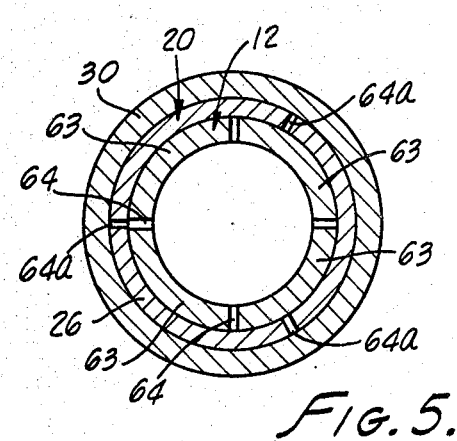
FIG. 5 is a sectional end view along lines 5—5 of FIG. 4 illustrating the relative positions of sleeves of the tool.
Figure 4:
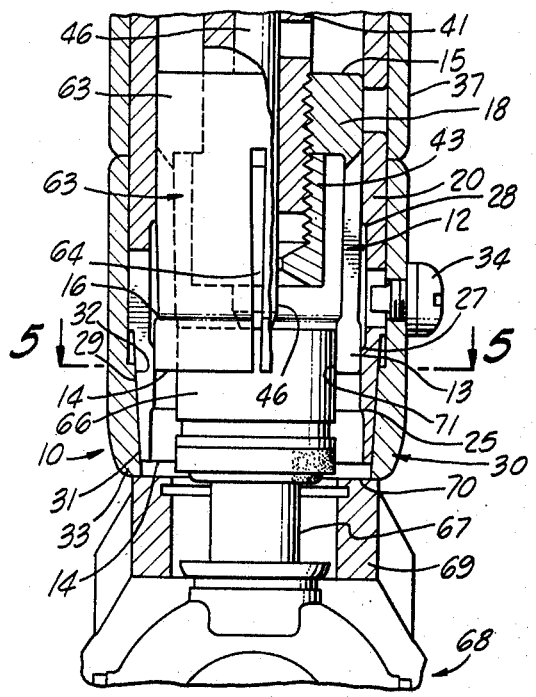
FIG. 4 is a partial sectional side view with portion in elevation showing the cup partially retracted from the arm of a universal joint.

As hydraulic pressure is built up in the cylinder 24 by the injection of hydraulic fluid through pipe 55 and port 57 the piston 40 is urged rearwardly in the cylinder 24. This causes the piston rod 41 to move rearwards and simultaneously the gripping sleeve 12 is pulled axially rearwardly along its pulling path as defined by the axis of the hydraulic tool. As this happens the steps 16 and 25 coact to force the limbs 63 inwardly thereby contracting the limbs 63 about the outside wall of cup 66 and this provides a transverse gripping force to the cup 66 as the cup 66 is pulled from the arm 67 of the universal joint 68 axially along the pulling path. The slots 64 are forced to take up a smaller width as is depicted in FIG. 5, and this compressed width of slot 64 is also illustrated in FIG. 4.

The axial and transverse force continues as the cup is drawn from the arm 67 and until the point that the built up ring 13 reaches step 27 on the retaining sleeve 20. FIG. 4 depicts the drawing of the cup partially from the arm 67 and the built up ring 13 partially positioned over the step 27 of retaining ring 20.

Figure 7:
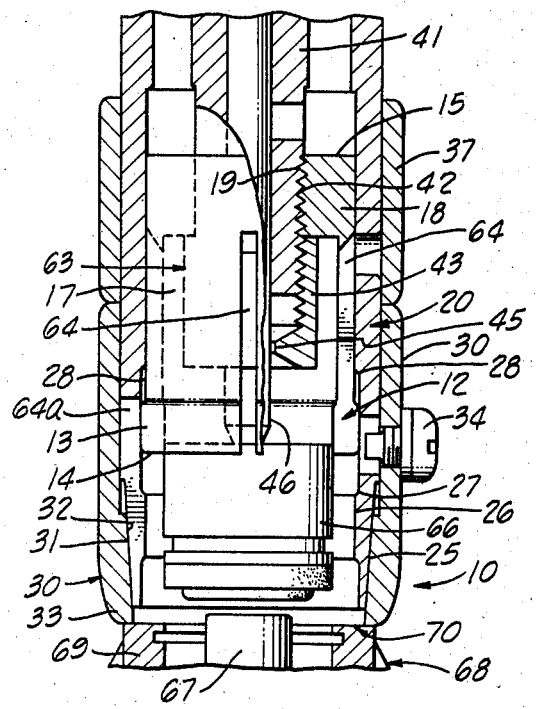
FIG. 7 is a partial sectional side view with portion in elevation showing the cup about to be ejected from the tool.
Figure 6:
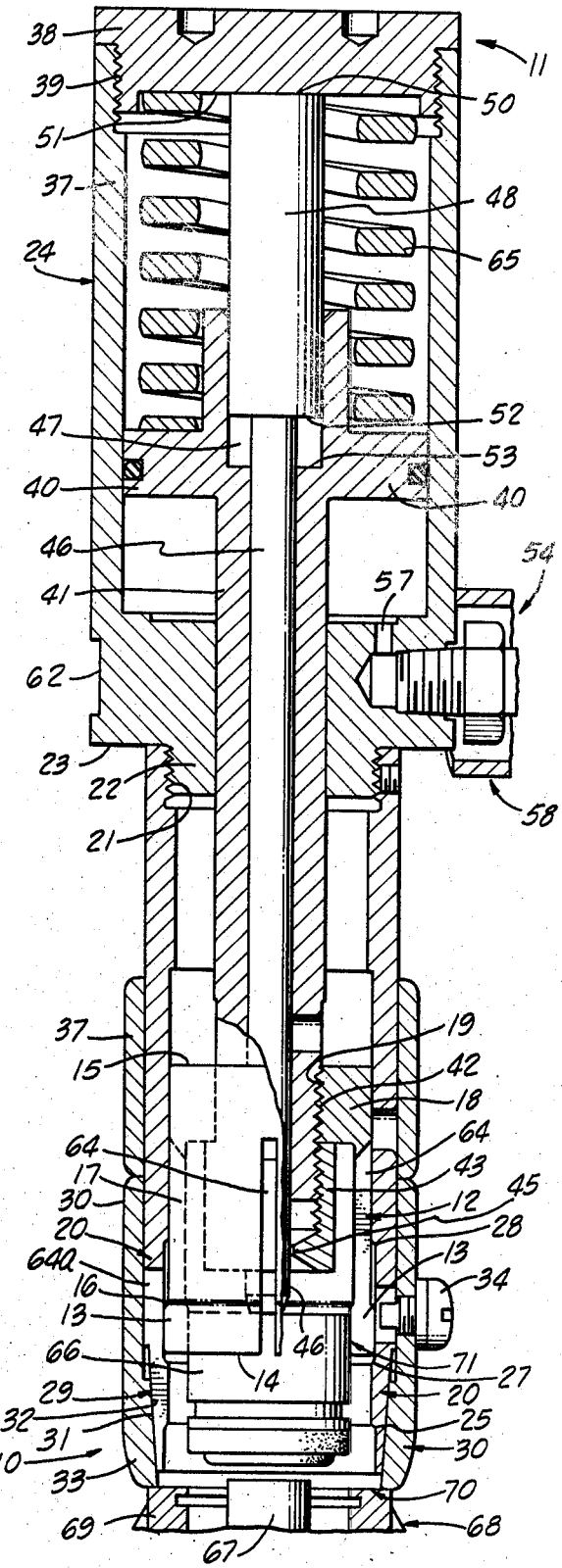
FIG. 6 is a sectional end view of the tool, with portion in elevation, showing the cup removed from the arm of a universal joint and with the ejectment from the tool about to commence.

As the pulling continues the gripping sleeve takes up the position illustrated in FIG. 6 whereupon the built up ring 13 when passing the step 27 expands so that the limbs 63 take up their normal repose. At the point illustrated in FIG. 6 the ejector rod action is about to commence in that the base 50 of the rod is in contact with the base wall 51 of base plate 38 of the cylinder 24. Further rearward movement of the piston rod 41 continues, but the ejector pin is now stationary and the leading end of ejector pin 46 commences to urge the cup from the gripping sleeve 12 which is being drawn rearwardly towards the cylinder 24 as the piston rod 41 retracts. As there is less transverse force on the cup 66, the cup 66 is free to move forwards under the action of the ejector pin 46. FIG. 7 illustrates the position where final ejectment of the cup from the gripping sleeve is about to occur.

After ejectment of the cup 66 the hydraulic pressure is released and under the spring action 5 the piston 40 is urged forwardly and this in turn moves the gripping sleeve 12 forwardly to the front end of the tool. As there is no cup between the limbs 63 of the tool the limbs 63 contract more easily and pass through the contracted zone defined between step 27 and step 25 of the retaining sleeve 20 and come to rest at the front end depicted in FIG. 1 of the drawings.

With the tool of the invention it has been found that cups from universal joints can be extracted simply and effectively without distorting the cups or the arms of the universal joint nor displacing the needle bearings contained between the cups and the arms. In this fashion it is possible to reuse cups and arms more easily than has been previously possible.

In other applications of the invention bearings and the like can be removed from shafts. The subject element which is to be removed from its anchorage may have a non-cylindrical shape, and so too may the gripping sleeve have such a non-cylindrical shape. Preferably it is desirable to have the subject element which is being removed mate with the internal shape of the gripping sleeve so that the force exerted transversely on the subject element can be substantially uniformly imparted to the element. In some situations, however, it is unnecessary to have such a uniform transverse force on the subject element.

In yet other forms of the invention the limbs of the gripping sleeve can be constituted by more or less in number, and further it can be effective to have only one or some of those limbs urged relatively inwardly.

In place of step formations defining the coacting surfaces between the outer wall of the gripping sleeve 20 and the inner wall of the retaining sleeve 20 a more tapered coacting relationship can be provided wherein transverse pressure can be increased if desirable as the longitudinal force increases and the gripping sleeve moves rearwardly. Furthermore a tool within the scope of the invention can omit the reaction sleeve 30, and the front edge of the retaining sleeve 30 provides the reaction edge against the anchorage from which the subject element is being pulled. Also the relative axial dispositions of the gripping sleeve, retaining sleeve, and reaction sleeve can be changed to suit various situations wherein the subject element is disposed at different heights relative to the anchorage. In this fashion versatility of the tool is improved. Likewise the internal diameter of the gripping sleeve can be varied to suit different situations.

Further variations of the tool would include replacing the return spring 65 with a form of hydraulic pneumatic pressure. This would be effected by providing a suitable bore in cap 38 through which the pressurized fluid would be provided. Also the tool can be adapted to pull over longer lengths by proportionately increasing the tool size and the geometry of the interacting sleeves 12, 20 and 30 and the pressure generating elements as required.

While the present invention has been shown and described herein with reference to a preferred embodiment and while some variations have been described it should be recognized that departures may be made therefrom within the scope of the invention, which is therefore not limited to the details disclosed herein but is to be accorded the full scope of the appended claims.

I claim:

1. A tool for pulling a subject element from an anchorage and having a forward end and a rear end, including a gripping member located at the forward end and movable under pressure along a defined pulling path towards the rear end, the gripping member having at least two limbs between which limbs the subject element is receivable, the limbs being movable relative to each other in a direction transverse the pulling path, retaining means located outside of the gripping member, the retaining means defining an inner wall coacting with the outer wall of at least one of the limbs of the gripping member in a position of the gripping means retracted from the front thereby urging the relative inward contraction of the limbs such contraction providing a transverse force from the limbs on the subject element, the outer wall of the gripping means having at its leading end an external step adapted to react with the inner wall of the retaining means, the step having an interacting surface substantially parallel to the pulling path and the inner wall of the retaining means, and the retaining means providing an edge adapted to react against the anchorage from which the subject element is pulled, pressure generating means, and connector means linking the pressure generating means with the gripping element to permit movement of the gripping element between the forward end and a position rearwardly of the forward end.

2. A tool for pulling a subject element from an anchorage and having a forward end and a rear end, including a gripping member located at the forward end and movable under pressure along a defined pulling path towards the rear end, the gripping member having at least two limbs between which limbs the subject element is receivable, the limbs being movable relative to each other in a direction transverse the pulling path, retaining means located outside of the gripping member, the retaining means defining an inner wall coacting with the outer wall of at least one of the limbs of the gripping member in a position of the gripping means retracted from the front thereby urging the relative inward contraction of the limbs such contraction providing a transverse force from the limbs on the subject element, the retaining means providing an edge adapted to react against the anchorage from which the subject element is pulled, pressure generating means, and connector means linking the pressure generating means with the gripping element to permit movement of the gripping element between the forward end and a position rearwardly of the forward end, and a transverse step between the coacting walls of the gripping member and retaining means whereby after a predetermined rearward movement, the limbs open thereby permitting release of the subject element.

3. A pulling tool as claimed in either claim 1 or claim 2 wherein the gripping member is a sleeve with longitudinal slots directed from its leading end rearwardly towards the rear end of the sleeve, the limbs being defined between the slots.

4. The pulling tool as claimed in claim 3 including at least four slots thereby defining at least four limbs.

5. The pulling tool as claimed in claim 3 wherein the retaining means is a sleeve anchored about the gripping sleeve, an internal step extending circumferentially about the sleeve and coacting with the external step such external step extending circumferentially about the gripping sleeve, the two steps coacting as the gripping sleeve is pulled rearwards the front end thereby developing the inward contraction.

6. The pulling tool as claimed in claim 4 wherein the retaining means is a sleeve anchored about the gripping sleeve, an internal step extending circumferentially about the sleeve and coacting with the external step such external step extending circumferentially about the gripping sleeve, the two steps coacting as the gripping sleeve is pulled rearward the front end thereby developing the inward contraction.

7. A tool for pulling a subject element from an anchorage and having a forward end and a rear end, including a gripping sleeve located at the forward end and movable under pressure along a defined pulling path towards the rear end, the gripping sleeve having at least two limbs between which limbs the subject element is receivable, the limbs being movable relative to each other in a direction transverse the pulling path, a retaining sleeve located outside of the gripping sleeve, the retaining sleeve defining an inner wall adapted to coact with the gripping sleeve, the outer wall of the gripping sleeve having at its leading end an external step adapted to coact with the inner wall of the retaining means, the step having an interacting surface substantially parallel to the pulling path and the inner wall of the retaining means, the inner wall thereby urging the inward relative contraction of the limbs on rearward movement of the gripping sleeve from the front end along the pulling path and such contraction providing a transverse force on the subject element, a reaction sleeve about the retaining sleeve, the reaction sleeve forward end providing the edge reacting against the anchorage from which the subject element is pulled, pressure generating means, and connector means linking the pressure generating means with the gripping sleeve to permit movement of the gripping sleeve between the forward end and a position rearwardly of the forward end.

8. A tool for pulling a subject element from an anchorage and having a forward end and a rear end, including a gripping sleeve located at the forward end and movable under pressure along a defined pulling path towards the rear end, the gripping sleeve having at least two limbs between which limbs the subject element is receivable, the limbs being movabel relative to each other in a direction transverse the pulling path, a retaining sleeve located outside of the gripping sleeve, the retaining sleeve defining an inner wall adapted to coact with the outer wall of the gripping sleeve, the inner wall thereby urging the inward relative contraction of the limbs on rearward movement of the gripping sleeve from the front end along the pulling path and such contraction providing a transverse force on the subject element, a reaction sleeve about the retaining sleeve, the reaction sleeve forward end providing the edge reacting against the anchorage from which the subject element is pulled, pressure generating means, connector means linking the pressure generating means with the gripping sleeve to permit movement of the gripping sleeve between the forward end and a position rearwardly of the forward end, and a transverse step between the coacting walls of the gripping sleeve and retaining sleeve whereby after a predetermined rearward movement, the limbs open thereby permitting release of the subject element.

9. The pulling tool as claimed in claim 7 or 8 wherein in the forward position of the gripping sleeve the leading end of the reaction sleeve is set ahead of the gripping sleeve and the retaining sleeve.

10. The pulling tool as claimed in claim 8 wherein in the forward position the gripping sleeve and retaining sleeve are set substantially flush at their leading end, and coacting step formations between the gripping and retaining sleeve retain this position.

11. The pulling tool as claimed in either claim 7 or claim 8 wherein the gripping sleeve, retaining sleeve and reaction sleeve are relatively axially adjustable in the direction of the pulling path thereby to permit for effective use on different subject elements.

12. A tool for pulling a subject element from an anchorage and having a forward end and a rear end, including a gripping sleeve located at the forward end and movable under pressure along an axial pulling path towards the rear end, the gripping sleeve defining at least two limbs between which limbs the subject element is receivable, the limbs being movable relative to each other in a direction transverse the pulling path, a retaining sleeve located outside the gripping sleeve, the retaining sleeve providing a circumferential integral step and the gripping sleeve providing an external circumferential step, the steps coacting with each other in a position of the gripping sleeve retracted from the front thereby urging the relative inward contraction of the limbs as the gripping sleeve is moved rearwards on the pulling path thereby providing a transverse force on the subject element, the steps providing interacting surfaces parallel to the pulling path, a reaction sleeve located about the retaining sleeve, the reaction sleeve providing a leading circumferential edge for abutting the anchorage from which the subject element is pulled, a piston rod actuatable by a piston responsive to hydraulic pressure, and the tripping sleeve being connected with the piston rod thereby to move the gripping sleeve responsively to the piston movement.

13. The pulling tool as claimed in claim 12 including a transverse step between the coacting walls of the gripping sleeve and retaining sleeve whereby after a predetermined rearward movement, the limbs open thereby permitting release of the subject element.

14. The pulling tool as claimed in either claim 12 or claim 13, including a cylinder for housing the piston and wherein hydraulic fluid is fed into the cylinder forwardly of the piston such that an increase in pressure causes piston retraction, and a spring located within the housing rearwardly of the piston acting to urge the piston forward after hydraulic pressure release.

15. A tool for pulling under hydraulic pressure a subject element from an anchorage, being of generally elongated shape and having a forward end and a rear end, a gripping sleeve located at the forward end and restricted for axial movement along a pulling path, the gripping sleeve defining four limbs relatively movable transversely to the pulling path, axially directed slots from the leading end of the gripping sleeve to a zone between the leading end and the rear end of the sleeve, the limbs being defined between the slots, a retaining sleeve snugly located about the gripping sleeve and providing a stepped formation on the inner wall reacting with a stepped formation on the outer wall of the gripping sleeve such that as the gripping sleeve is pulled rearwardly in the axial pulling path the limbs contract transversely thereby providing a transverse force on the pulled element, a transverse circumferential step towards the rear end of the retaining member, the step permitting expansion of the four limbs as they pass the contracted zone thereby permitting release of the pulled subject element, a reaction sleeve about the retaining sleeve, the leading circumferential edge of the reaction sleeve being adapted to abut the anchorage from which the subject element is being pulled, a cylinder positioned rearwardly of the sleeves, a reciprocating piston therein and a piston rod connecting the piston with the rear end of the gripping sleeve, a feed for hydraulic fluid to the cylinder forwardly of the piston such that piston retracts rearwardly under hydraulic pressure, a spring located between the rear of the cylinder and the piston thereby to urge the piston forwardly, the piston rod being tubular and accommodating therein a longitudinal ejector pin, the leading end of the pin protruding centrally through the gripping sleeve as the pulled subject element is located at a predetermined position relative to the rear end, continued rearward travel of the gripping sleeve creating further protrusion of the ejector pin and urging forward ejectment of the pulled subject element from the gripping sleeve, the ejectment being effected on passage of the gripping sleeve beyond the transverse step in the retained sleeve.

16. The pulling tool as claimed in claim 8 wherein the subject element is cylindrical.

17. The pulling tool as claimed in claim 13 wherein the subject element is cylindrical.

18. The pulling tool as claimed in claim 17 wherein the cylindrical element is a cup located on the arm of a universal coupling.

19. The pulling tool as claimed in claim 16 wherein the cylindrical element is a cup located on the arm of a universal coupling.

20. The pulling tool as claimed in claim 15 wherein the subject element is a cup from a universal joint.

21. A tool for pulling a subject element from an anchorage and having a forward end and rear end, including a gripping sleeve located at the forward end and movable under pressure along an axial pulling path towards the rear end, the gripping sleeve defining at least two limbs between which limbs the subject element is receivable, the limbs being movable relative to each other in a direction transverse the pulling path, a retaining sleeve located outside the gripping sleeve, the retaining sleeve providing a circumferential integral step and the gripping sleeve providing an external circumferential step, the steps coacting with each other in a position of the gripping sleeve retracted from the front thereby urging the relative inward contraction of the limbs as the gripping sleeve is moved rearwards on the pulling path thereby providing a transverse force on the subject element, a reaction sleeve located about the retaining sleeve, the reaction sleeve providing a leading circumferential edge for abutting the anchorage from which the subject element is pulled, a piston rod actuatable by a piston responsive to hydraulic pressure, and the gripping sleeve being connected with the piston rod thereby to move the gripping sleeve responsively to the piston movement, wherein the piston rod is tubular and an ejector pin passes therethrough, the rearwards movement of the ejector pin being limited by a base plate in the rear of the cylinder, the pin length being determined so that the leading end of pin protrudes from the tubular piston rod after predetermined piston rod retraction from the forward end, and the leading end of the ejector pin reacting against the leading end of the subject element as the subject element is pulled into the tool thereby urging forward ejection of the subject element from the gripping sleeve as the gripping sleeve continues rearward movement.

22. A tool for pulling a subject element from an anchorage and having a forward end and a rear end, including a gripping sleeve located at the forward end and movable under pressure along an axial pulling path towards the rear end, the gripping sleeve defining at least two limbs between which limbs the subject element is receivable, the limbs being movable relative to each other in a direction transverse the pulling path, a retaining sleeve located outside the gripping sleeve, the retaining sleeve providing a circumferential integral step, the steps coacting with each other in a position of the gripping sleeve retracted from the front thereby urging the relative inward contraction of the limbs as the gripping sleeve is moved rearwards on the pulling path thereby providing a transverse force on the subject element, a reaction sleeve located about the retaining sleeve, the reaction sleeve located about the retaining sleeve, the reaction sleeve providing a leading circumferential edge for abutting the anchorage from which the subject element is pulled, a piston rod actuatable by a piston responsive to hydraulic pressure, and the gripping sleeve being connected with the piston rod thereby to move the gripping sleeve responsively to the piston movement, including a transverse step between the coacting walls of the gripping sleeve and retaining sleeve whereby after a predetermined rearward movement, the limbs open thereby permitting release of the subject element, and wherein the piston rod is tubular and an ejector pin passes therethrough, the rearwards movement of the ejector pin being limited by a base plate in the rear of the cylinder, the pin length being determined so that the leading end of pin protrudes from the tubular piston rod after predetermined piston rod retraction from the forward end, and the leading end of the ejector pin reacting against the leading end of the ejector pin reacting against the leading end of the subject element as the subject element is pulled into the tool thereby urging foward ejection of the subject element from the gripping sleeve as the gripping sleeve continues rearward movement.

23. A tool for pulling a subject element from an anchorage and having a forward and and a rear end, including a gripping sleeve located at the forward end and movable under pressure along an axial pulling path towards the rear end, the gripping sleeve defining at least two limbs between which limbs the subject element is receivable, the limbs being movable relative to each other in a direction transverse the pulling path, a retaining sleeve located outside the gripping sleeve, the retaining sleeve providing a circumferential integral step and the gripping sleeve providing an external circumferential integral step and the gripping sleeve providing an external circumferential step, the steps coacting with each other in a position of the gripping sleeve retracted from the front thereby urging the relative inward contraction of the limbs as the gripping sleeve is moved rearwards on the pulling path thereby providing a transverse force on the subject element, a reaction sleeve located about the retaining sleeve, the reaction sleeve providing a leading circumferential edge for abutting the anchorage from which the subject element is pulled, a piston rod actuatable by a piston responsive to hydraulic pressure, and the gripping sleeve being connected with the piston rod thereby to move the gripping sleeve responsively to the piston movement, including a handle substantially centrally disposed along the tool length and extending transverse the tool, the handle including a passage to accommodate a hydraulic fluid line passing into sealing connection with an aperture to the hydraulic cylinder.

24. A tool as claimed in claim 1 wherein the retaining means includes an inward step adapted to coact with the outward step of the gripping means, the inward step having a surface substantially parallel to the pulling path.

25. A tool as claimed in claim 7 wherein the retaining sleeve includes an inward step adapted to coact with the outward step of the gripping sleeve, the inward step having a surface substantially parallel to the pulling path.

* * * * *